J. M. BERRY.
DEMOUNTABLE RIM.
APPLICATION FILED APR. 7, 1916.
1,333,748.
Patented Mar. 16, 1920.
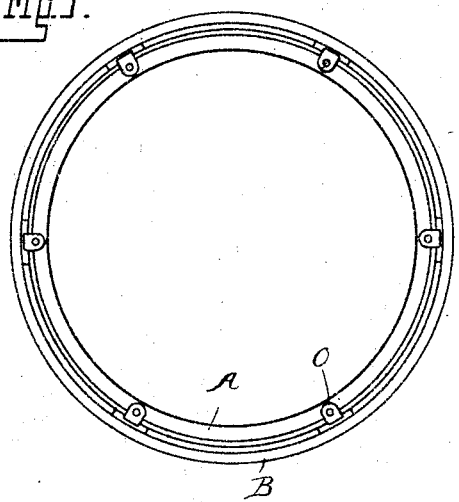
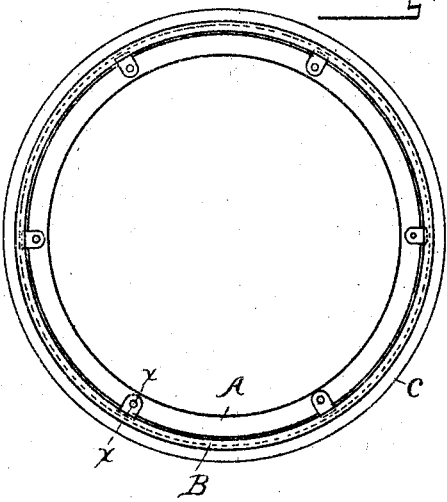
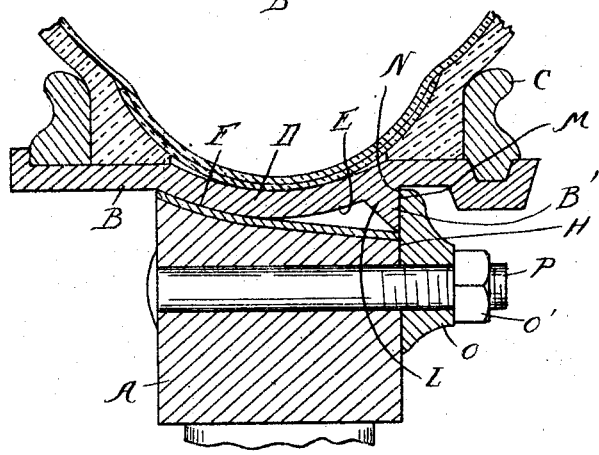
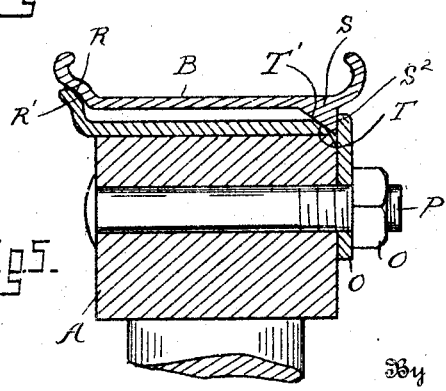
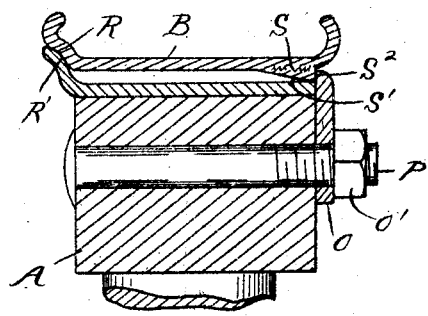
Inventor
James M. Berry
By Whittemore Hulbert & Whittemore
Attorneys

UNITED STATES PATENT OFFICE.

JAMES M. BERRY, OF DETROIT, MICHIGAN.

DEMOUNTABLE RIM.

1,333,748. Specification of Letters Patent. Patented Mar. 16, 1920.

Application filed April 7, 1916. Serial No. 89,581.

*To all whom it may concern:*

Be it known that I, JAMES M. BERRY, a citizen of the United States of America, residing at Detroit, in the county of Wayne and State of Michigan, have invented certain new and useful Improvements in Demountable Rims, of which the following is a specification, reference being had therein to the accompanying drawings.

This invention relates to demountable rims, and refers more particularly to that type of rim which is also provided with a detachable side flange; although the invention in its broader aspects is not limited to use with the detachable side flange type of rim.

The salient objects of the invention are to provide a construction in which the locking member for the demountable rim can be located entirely outside of the plane of the felly; to provide a construction in which the locking members act in one direction only; to so construct and arrange the felly and the demountable rim that when the latter is in place upon the felly or permanent band it will be properly supported on both sides; to utilize a member or members, preferably permanently attached to the rim for holding the rim from inward radial movement; to provide a construction which can be economically manufactured and assembled and in general to provide a new and improved construction of the character above referred to.

The invention further resides in such features of construction and arrangements and combinations of parts as will more fully hereinafter appear.

In the drawings:

Figure 1 is a side elevational view of a wheel rim embodying my invention.

Fig. 2 is an enlarged cross section on the line $x$—$x$ of Fig. 1.

Figs. 3 and 4 are views similar to Figs. 1 and 2 but showing a modification.

Fig. 5 is a cross sectional view of a still further modification.

Describing first in detail the construction shown in Figs. 1 and 2, A designates the felly and B the demountable rim. The latter may or may not be of the detachable side flange type in which one of the flanges C is detachable from the rim to permit the tire being drawn off that side of the rim after the detachable flange has been removed. To aid in taking off the tire the central portion of the rim has a concaved seat D, the outer surface E being convex. One side of this curved seat fits against a concaved seat F formed in the permanent band which is shrunk or otherwise secured upon the felly.

It will be noticed that in this construction the felly tapers toward the edge H over which the rim is removable. This would normally leave an unsupported part of the rim which would be spaced from the felly or permanent band. To support this side of the demountable rim I provide a flange B' which has an inclined surface L and a straight outer surface M against which the plane inner surface N of the locking member O bears. When the nut O' on the bolt P is tightened up the surface N bearing against the outer surface M of the flange will force the flange L to ride up the inclined surface of the felly or felly band. Thus upon tightening up the nut the locking member will simply force the demountable rim laterally to its seat and the support of the rim upon the felly is direct and not through the locking member as in the previous devices.

In Figs. 3 and 4 I have shown a modified construction in which the outer surface of the felly is substantially straight and the usual type of demountable rim employed. In this construction the surface R of the rim rests on the raised portion R' of the permanent band and the demountable rim is supported at the other side by spaced lugs S or supporting members having a plane outer surface $S^2$ and an inclined surface S'. In both constructions any adjustment of the demountable rim outward from the felly is caused by the inclined side of the flange L or lugs S riding up on the edge of the felly or permanent band when the locking nut is tightened up.

In the still further modification shown in Fig. 5 the general arrangement is similar to that shown in Fig. 4 except that the lug S projects downward farther and its inner surface T' rides up the inclined surface T of the permanent band or felly. In order that there may be only a line contact, the surface T is preferably curved. Thus when the clamping nut O' is tightened up the lugs S will ride up the surface T and support this side of the rim properly spaced from the permanent band or felly.

What I claim as my invention is:

1. The combination with a wheel body having an inclined rim receiving seat, of a demountable rim engageable with said seat formed with a circumferentially extending inward depression, exteriorly of said rim forming a seat for a tire, and interiorly of the rim forming a shoulder engageable with the inclined surface of the wheel body at one side of said body, an inward projection at the other side of the rim engageable with the lower portion of the inclined surface, and means adapted to force the rim sidewise upon the wheel body.

2. The combination with a wheel body having a rim receiving seat inclined adjacent to the side thereof, of a demountable rim engageable with said seat formed with a circumferential inward depression exteriorly of said rim forming a seat for a tire, and interiorly of the rim forming a shoulder engageable with the inclined portion of said seat, an inward projection at the other side of the rim engageable with the other side of said seat, and means adapted to force the rim sidewise upon said seat.

In testimony whereof I affix my signature.

JAMES M. BERRY.